Sept 10, 1957 E. H. GATZERT 2,806,089

CONNECTOR CIRCUIT

Filed Jan. 9, 1956 5 Sheets-Sheet 1

INVENTOR.
ERNEST H. GATZERT

BY [signature]

ATTORNEY

Sept 10, 1957 E. H. GATZERT 2,806,089

CONNECTOR CIRCUIT

Filed Jan. 9, 1956 5 Sheets-Sheet 2

Sept 10, 1957 E. H. GATZERT 2,806,089

CONNECTOR CIRCUIT

Filed Jan. 9, 1956 5 Sheets-Sheet 3

Sept 10, 1957 E. H. GATZERT 2,806,089

CONNECTOR CIRCUIT

Filed Jan. 9, 1956 5 Sheets-Sheet 5

United States Patent Office 2,806,089

Patented Sept. 10, 1957

2,806,089

CONNECTOR CIRCUIT

Ernest H. Gatzert, Rochester, N. Y., assignor to General Dynamics Corporation, Rochester, N. Y., a corporation of Delaware Application January 9, 1956, Serial No. 558,075

3 Claims. (Cl. 179—18)

This invention relates to telephone systems and more particularly to connector circuits for use in such systems.

In the past, connectors have been provided with either regular ringing current generating means or party selecting, ringing current generating means. The particular generating means that was used depended upon which of several connectors was included in establishing a call. A desirable connector would be provided with means for using either type of generating means so that subscribers of different categories may be called without requiring unique connectors which are custom designed for each installation.

Therefore, an object of this invention is to provide a new and improved connector.

Another object of this invention is to provide means in a connector for distinguishing between the various classes of called subscribers and to extend a particular ringing current depending upon the class.

Still another object of this invention is to switch a connector from one type of ringing operation to another type of ringing operation, depending upon the class into which the called party falls.

This invention provides means for accomplishing these and other objects by providing means for identifying the category into which the called subscriber falls. The ringing generating means is switched according to this identification to provide the proper currents. In the preferred embodiment of my invention, switching is responsive to level marking.

It is thought that these and other objects will be obvious from a description of the invention in connection with the attached drawings in which.

Figures 1, 6:
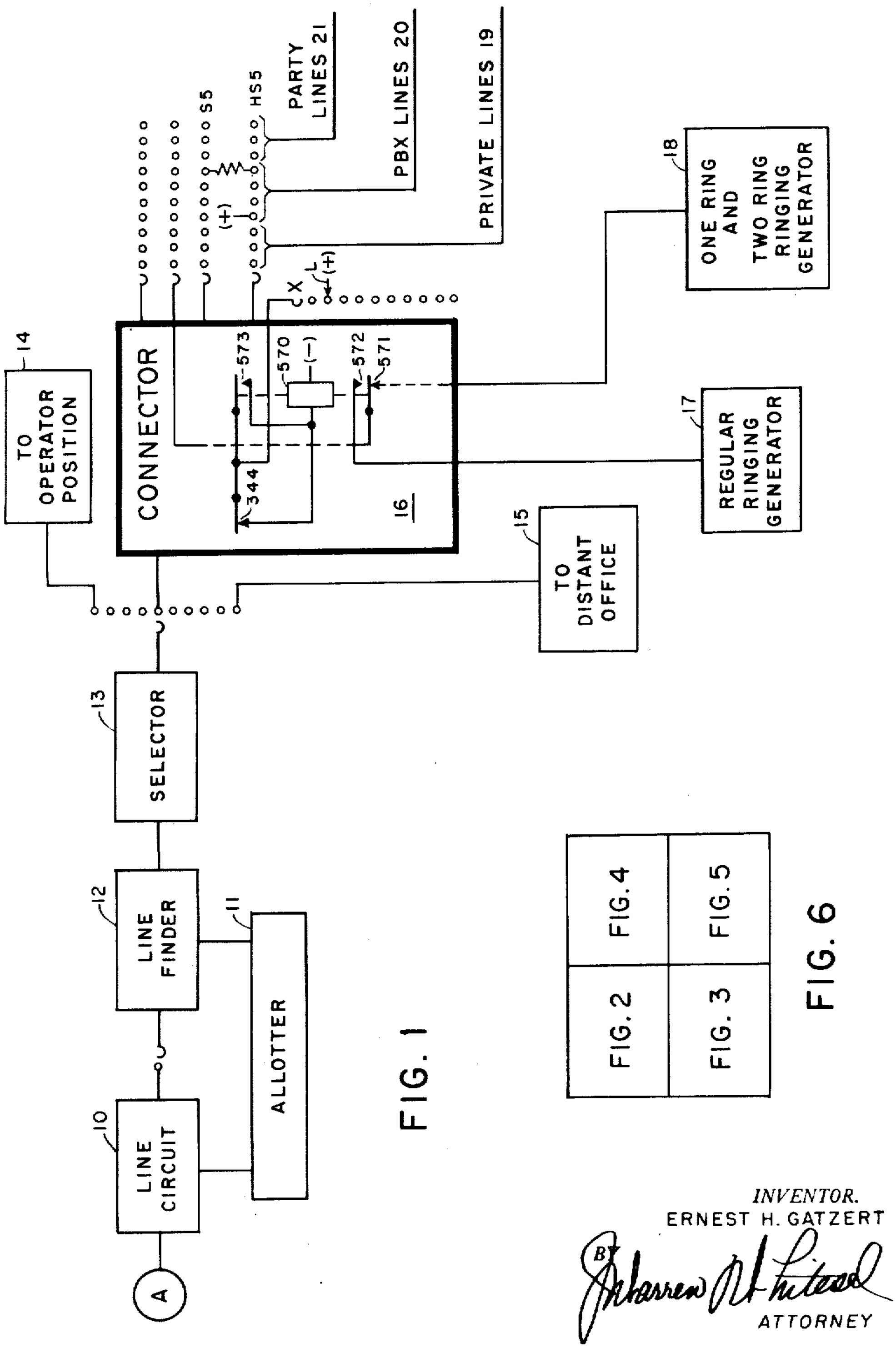
Fig. 1 shows mostly in block outline a telephone system which is adapted to use the subject invention.
Fig. 6 shows the manner in which the remaining figures should be joined to provide a complete and understandable circuit.
Figure 2:
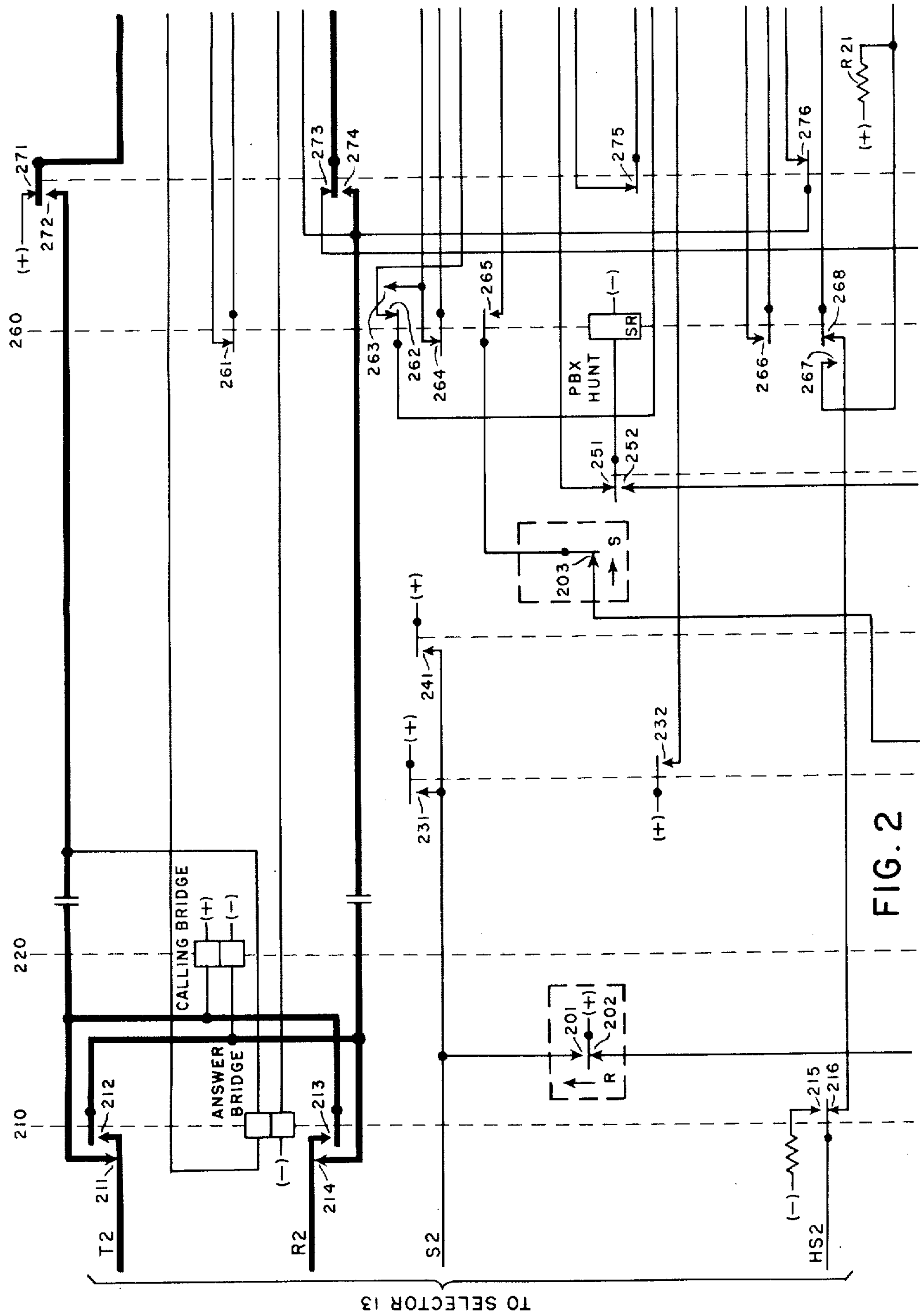
Figs. 2–5 show circuit details of the connector.
Figure 3:
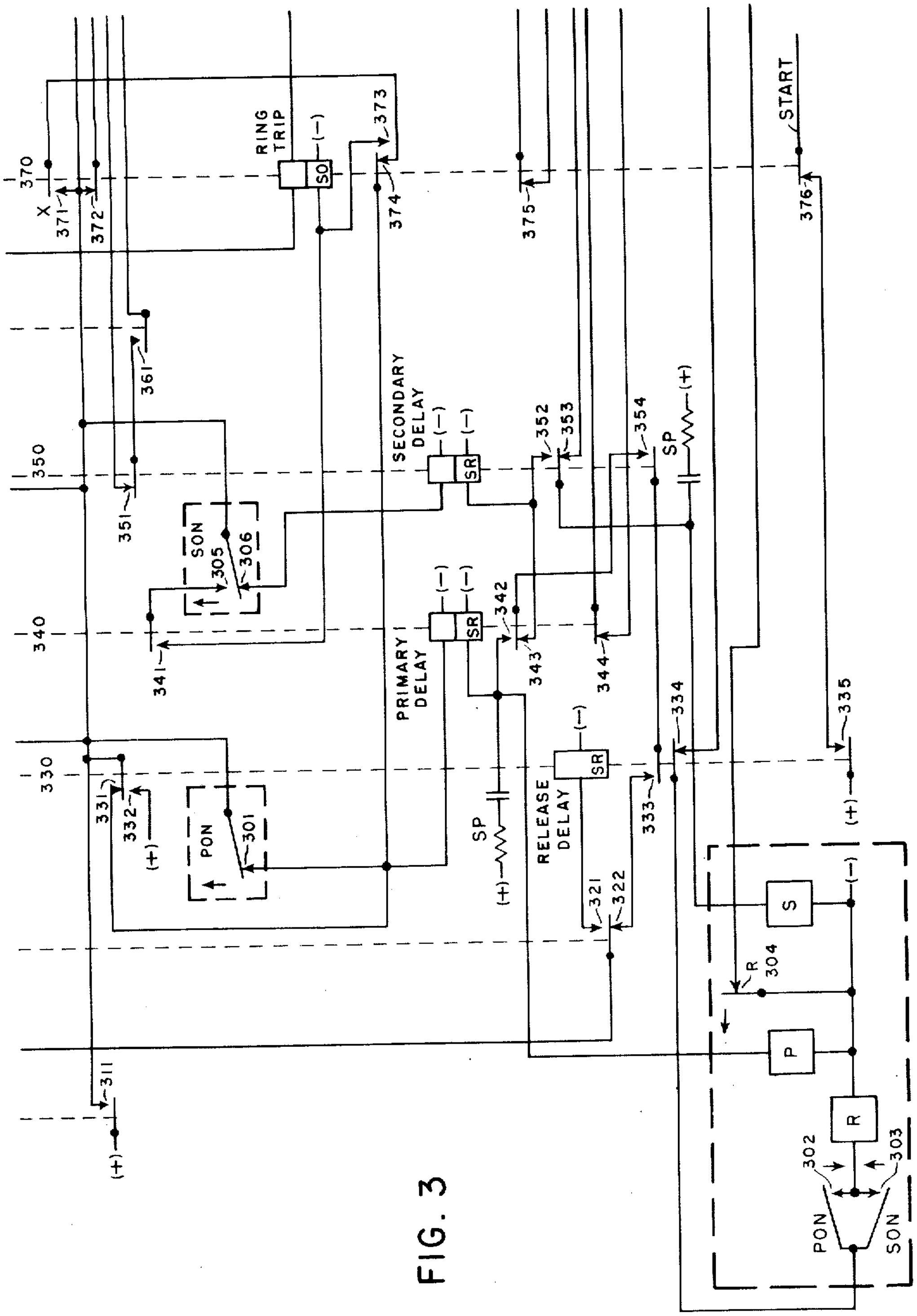

In the drawings, plus (+) and minus (−) signs have been used to show the source of office potential. As is the case in most telephone systems, the plus terminal is described as being connected with ground, hence the terms "(−) battery" and "ground (+)" are used. It should be obvious that either this or any other suitable power supply may be used. Also, in Fig. 1, the portion of the system which includes the invention is shown by a heavily inked rectangle 16. This same feature is shown in detail in the remainder of the drawings.

BRIEF DESCRIPTION

Referring to Fig. 1, there is a block diagram which may be used to describe the invention briefly. For example, subscriber A may lift his receiver thereby completing a loop for causing line circuit 10 to mark a calling line. Allotter 11 and line finder 12 cooperate to find the calling line and to connect it to selector 13. Subscriber A may then dial any suitable digit indications for causing selector 13 to seize either a connector 16, an operator position 14, or a distant office 15, as the case may be.

In this description, we assume that the call has been directed to connector 16; therefore it is necessary to determine whether the call is intended for an individual or private line 19, a P. B. X line 20, or party lines 21. In passing it might be noted that the term "private line" is used hereinafter to distinguish individual or single subscriber lines from party lines. If the call is for either private lines 19 or P. B. X lines 20, it is necessary to furnish signaling current from the regular ringing current generator 17. On the other hand, if the call is directed to party lines 21, it is necessary to furnish ringing current from the special generator shown in block 18. This may, of course, be any type of generator; however I have shown it as a one and two ring type of generator.

Level marking relay 570 is operated by a ground (+) marking extended over brush and conductor X from the L wiring if the call is to a level which gives service to either a private branch exchange P. B. X or private lines. Level marking relay 570 operates over contacts 344 and thereafter locks over contacts 573. On the other hand, if the call is to a party line, there is no L wiring connected to the particular level that is dialed; hence, relay 570 does not operate. The special ringing current generator 18 is effective over contacts 571 for extending ringing current over the talking conductors when there is no level marking. On the other, regular ringing current generator 17 is effective over contacts 572 when there is level marking.

DETAILED DESCRIPTION

Figs. 2–5 when joined in the manner shown in Fig. 6 show details of connector 16. The banks of contacts, HS5 and S5, are also shown near the righthand edge of Fig. 4. The conductors leading to generators 17 and 18 are shown near the upper righthand corner of Fig. 5. The access from selector 13 is shown near the upper lefthand corner of Fig. 2.

Turning now to a description of the connector in greater detail, reference is made to the circuit shown in Figs. 2–5.

P. B. X CALL

*Seizure.*—The connector is seized when the preceding selector or other equipment completes a loop across conductors T2 and R2. This loop may be completed by any well known equipment such as a switchthrough relay in a preceding switch circuit, for example. Responsive thereto, calling bridge relay 220 operates. The circuit may be traced from (−) battery through the lower winding of relay 220, rest contacts 214, conductor R2, the preceding equipment, and return over conductor T2, contacts 211, and the upper winding of calling bridge relay 220 to ground (+). Relay 220 is used to seize the connector, to receive and repeat digit pulses and to furnish talking battery to the calling subscriber.

Contacts 321 close to operate release delay relay 330. The circuit for operating release delay relay 330 may be traced from (−) battery through operated contacts 321, release magnet interrupter contacts 202 and ground (+). Release delay relay 330 functions to hold the connector in an operated condition throughout the receipt of digit pulses and to control the release of the switch after disconnect. Contacts 231 close thereby extending ground (+) over sleeve conductor S2. This ground marking is used to hold preceding equipment and to mark the connector switch as busy to all other calls. Contacts 232 close thereby extending ground (+) to contacts 453, the upper winding of switchthrough relay 460, rest contacts 264, and conductor S4. This circuit will be used later during the call when tests are made to determine whether the called line is idle or busy. Contacts 332 close to supply master ground which is used to hold most of the equipment shown in Figs. 2–5 in its operated condition when necessary. Therefore, when this ground is removed at the end of the call, the equipment will release. Contacts 333 close to prepare part of the pulsing circuit. This circuit will be explained later in the section entitled "Dialing." Contacts 334 open to break one of the circuits that is used during release. Contacts 335 close thereby applying marking ground (+) to the start conductor. This marking is used to operate any suitable common equipment which may be necessary to complete the call. For example, it may start an interrupter machine.

Primary delay relay 340 operates when master ground is applied. The circuit may be traced from (−) battery through the upper winding of primary delay relay 340, resting primary off-normal contacts 301 and operated contacts 332 to ground (+). Primary delay relay 340 is used later to mark the end of the first digit pulse train and to switch the pulsing circuit from the primary magnet to the secondary magnet thus changing the direction in which the switch will move. Responsive to the operation of relay 340, contacts 241 close to extend an alternate ground (+) marking over sleeve conductor S2. Contacts 341 close to prepare a circuit for use later during the call. Contacts 342 close to prepare a circuit for primary stepping magnet P. Contacts 344, when closed upon restoration of relay 340, will connect the X wiper to level marking relay 570.

Secondary delay relay 350 also is operated when master ground is applied at contacts 332, the circuit extending from (−) battery through the upper winding of secondary delay relay 350, resting secondary off-normal contacts 306 and contacts 332 to ground (+). The secondary delay relay is used later to mark the end of the second digit pulse train and to switch the pulsing circuit for P. B. X trunk hunting, if that is required. Contacts 252 close to operate P. B. X hunt relay 260, i. e., over the circuit from ground (+) through contacts 332, 252 and the winding of relay 260 to (−) battery. Contacts 352 prepare for operation of secondary magnet S to cause the secondary motion of the switch, as explained in the section entitled "Secondary switch motion." Contacts 354 close to additionally prepare the pulsing circuit to primary magnet P. This circuit may be traced from (−) battery through primary magnet P, operated contacts 342, 354 and 333 to contacts 322 which are now open. These last mentioned contacts will be used to repeat digit pulses.

P. B. X hunt relay 260 operates over the previously traced circuit. It is a slow release relay that is used to mark the end of trunk hunting. Contacts 266 close to prepare a circuit for hunt assist relay 420. Contacts 267 close to extend the ground (+) marking which is connected through resistance R21, over conductor HS2 to the preceding equipment, where the marking may be utilized for any suitable purpose. Contacts 361 have no function at this time since contacts 351 are now standing open.

The circuit has been seized and prepared for the receipt of digit pulsing. Nothing further happens until the calling subscriber transmits a suitable number of digit pulses for directing the switch to seize the called line, or to search for an idle trunk, as the case may be.

*Dialing.*—Digit pulsing is in the manner of the well known loop pulsing. That is to say, conductors T2 and R2 are extended through a preceding switch train to the calling subscriber's station. At that point, a loop is completed between conductors T2 and R2 by way of dial impulsing contacts. When the calling subscriber dials, the loop across the two conductors is broken a suitable number of times, depending upon the particular value of the digit that was transmitted. Responsive to each pulse or break in the loop, calling bridge relay 220 restores. Contacts 321 open responsive to each pulse to deenergize release delay relay 330; however, it is slow-to-release and does not restore during the time required to transmit a normal digit pulse break. At the same time, contacts 322 close to energize primary delay relay 340 and in parallel therewith to energize primary stepping magnet P, thus driving the switch one step in its primary direction. The circuit may be traced from ground (+) through release magnet interrupter contacts 202, now closed pulsing contacts 322, operated contacts 333, 354 and 342 and in parallel through the winding of primary magnet P to (−) battery and through the lower winding of relay 340 to (−) battery.

*Primary switch motion.*—On the first step, the various off-normal contacts marked with the letters "PON" are operated. Contacts 301 open to break the original operating circuit for primary delay relay 340. Thereafter, relay 340 is held energized by the digit pulses which are transmitted through its lower winding. It is constructed so that it will not release as long as it is receiving digit pulses, which recur quicker than the time release interval required for relay 340 to restore.

The entire digit pulse train is received and the switch is stepped one step in its primary direction for each digit pulse, as it is repeated at contacts 322. When the last digit pulse has been received, contacts 322 remain open for a period which is longer than the release time of primary delay relay 340. It restores. Contacts 342 open and 343 close, thus breaking the stepping push to primary magnet P and closing the stepping path to secondary magnet S.

*Level marking.*—The next function which occurs depends upon the particular level to which the brush X is directed during primary switch motion. It might be noted that the switch is constructed so that brush X is advanced one step with each digit so that the brush is now standing on a contact which is individual to the level to which the switch has been stepped. If that level is marked by a wiring L in the X bank, a ground marking is extended over brush and conductor X, contacts 344, the winding of level marking relay 570, and release magnet interrupter contacts R304 to (−) battery. In this case, level marking relay 570 operates and closes its contacts 573 thereby locking over conductor and brush X to the ground (+) marking via wiring L. The circuit for applying ringing current is switched from the special one or two code ringing current generator to a regular ringing current generator at contacts 571 and 572. The regular ringing current generator is not coded but is used to ring either private lines or P. B. X lines. Contacts 471 and 472 prepare a circuit to test for whether there is to be trunk hunting or not. This feature will be explained below in the section entitled "Trunk hunting." There would not be trunk hunting unless there were need for a regular ringing current generator; therefore, there will be no trunk hunting unless level marking relay 570 is operated.

*Secondary switch motion.*—Each time that a pulse in the second digit pulse train is received, calling bridge relay 220 restores to open contacts 321 and close contacts 322. Again, release delay relay 330 depends upon its slow release characteristics to hold it in an operated condition throughout the second digit pulse train. A circuit is completed from ground (+) through resting contacts 202, 322, operated contacts 333, 354, rest contacts 343 to (−) battery through the lower winding of relay 350 and in parallel therewith through operated contacts 352 and the winding of secondary magnet S to (−) battery. Each time that magnet S is energized by a digit pulse, the switch mechanism is driven one step in its secondary direction. Responsive to the first step in the secondary direction, the various secondary off-normal contacts marked with the letters "SON" are operated. Contacts 306 open and 305 close. Contacts 305 prepare for ring trip control, while contacts 306 break the original operating circuit for secondary delay relay 350. Thereafter, this relay depends for its continued operation upon the current which it receives during digit pulsing and upon its slow release characteristics which prevent it from releasing as long as the pulsing current is received.

After the last digit in the second digit pulse train has been received, contacts 322 remain open for a period which is longer than the slow release time of secondary delay relay 350. Thus, it release thereby breaking the original pulsing circuit at contacts 354 and 352. Contacts 252 open and 251 close thus deenergizing party hunt relay 260. However, partly hunt relay 260 is a slow release relay so that there is a period after relay 350 has restored and before relay 260 restores, during which a circuit is completed to test for whether there is or is not to be P. B. X trunk hunting.

*Trunk hunting.*—Three possible calls may be made. The first is a call to a private line, the second is a call to a private branch exchange (P. B. X.), and the third is a call to a party line. If it is assumed that level marking relay 570 is operated, the line to which the switch has been directed is one which involves either private lines or P. B. X lines both of which require the regular ringing current generator. For the sake of explanation, it is assumed that the first call is one which is to a P. B. X line.

Figure 4:
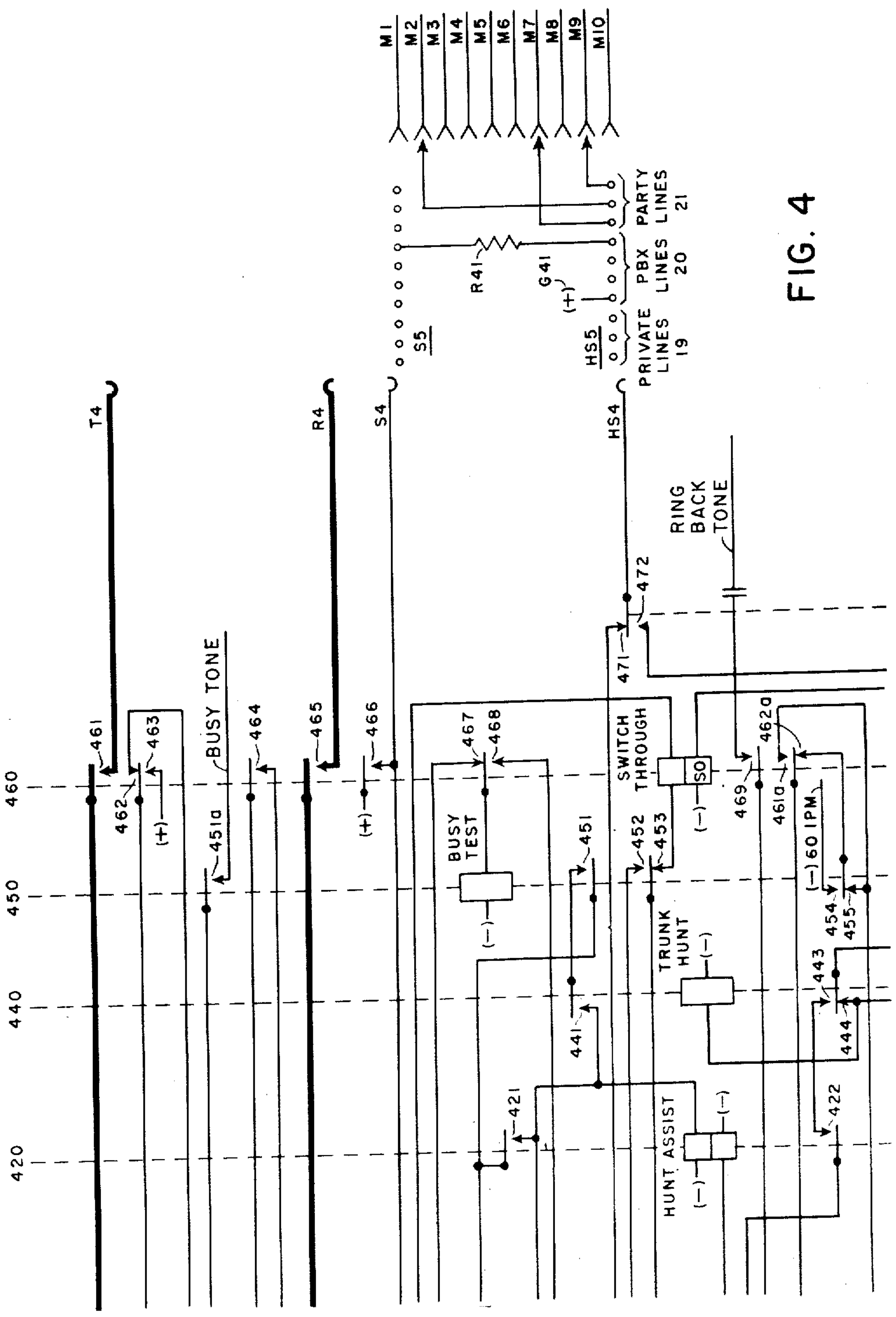
Figure 5:
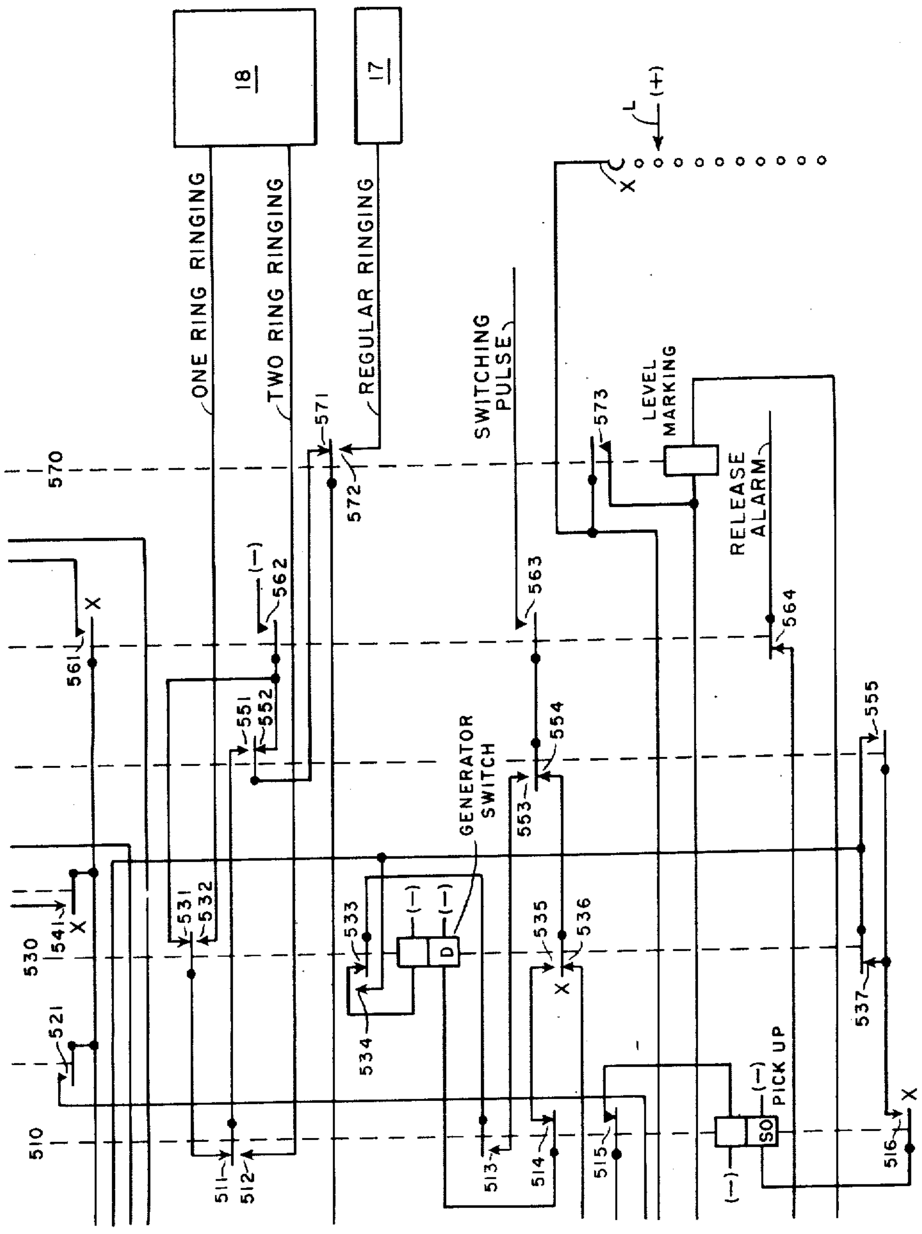

Referring to the righthand portion of Fig. 4, there are shown the S5 and HS5 banks of contacts. In this showing, the first five lines are individual or private lines which have no marking on the HS bank. The next four lines are a group of P. B. X trunk lines which has ground (+) connected to the first HS terminal in the P. B. X group and resistor R41 connected between the S and HS terminals at the end of the P. B. X trunk group. The last three lines in the bank are party lines. It should be understood that no single level would normally include all types of lines; however this showing has been made to illustrate all of the conditions under which the connector may operate. A strapping for the HS conductor is connected between each one of the party line terminals and a particular ringing current selecting strap marked M1–M10, depending upon the particular code that is required to ring the called party.

Since it is assumed that the call is extended to a private branch exchange, ground G41 is applied to bank HS5 and brush HS4 since it is assumed that the switch has been directed to the first terminals of a P. B. X trunk group. A circuit is completed for extending this ground (+) marking during the period after secondary delay relay 350 has restored and before party hunt relay 260 can restore, due to its slow release characteristics. This circuit extends from brush HS4 through contacts 472, 361, 351, 444 and the winding of trunk hunt relay 440 to (−) battery.

Trunk hunting relay 440 operates to close its "X" or preliminary contacts 541 thereby locking to master ground at contacts 332. It is noted that the "X" or preliminary contacts close before contacts 444 open to break the original operating circuit for trunk hunt relay 440. Contacts 441 close to prepare a circuit for hunt assist relay 420.

*Busy test.*—The next thing that happens depends upon whether the first line of the P. B. X trunk group is or is not busy. If it is busy, there is a circuit for operating busy test relay 450 from the ground marking that is applied to bank S5 and brush S4 by the busy circuit. A circuit for operating busy test relay 450 may be traced from (−) battery through the winding of relay 450, rest contacts 467, operated contacts 263 and sleeve brush S4 to the busy ground applied at the line circuit. Busy test relay 450 operates, closes its contacts 451, and completes a circuit for operating hunt assist relay 420. This circuit may be traced from (−) battery through the upper winding of relay 420, operated contacts 441, 451, 265, secondary magnet interrupter contacts 203 and contacts 332 to master ground (+).

Hunt assist relay 420 operates. It closes contacts 421 thereby re-energizing P. B. X hunt relay 260. It might be noted that all of this has happened since secondary delay relay 350 opened contacts 352 and during the slow release time of relay 260. The circuit for re-energizing this relay extends from (−) battery through the winding of relay 260, rest contacts 251, operated contacts 421, operated contacts 265, secondary magnet interrupter contacts 203 and contacts 332 to ground (+). A circuit is completed from (−) battery through the lower winding of hunt assist relay 420, operated contacts 266, 422, 443, 351, 361, 472, conductor HS4, and the busy ground marking. This circuit is to prepare for testing to determine whether the switch will continue to trunk hunt or has reached the end of the private branch exchange trunk group. Contacts 521 close to extend ground (+) to operate secondary magnet S thereby causing the switch to be driven one step in its secondary direction. This circuit may be traced from (−) battery through the winding of secondary magnet S, rest contacts 353, operated contacts 521 and 332 to ground (+). Magnet S operates and drives the switch to the next trunk in the P. B. X trunk group.

Secondary interrupter magnet contacts 203 are opened by the mechanism of the switch as it steps. Therefore, hunt assist relay 420 is released. This in turn opens contacts 521 and magnet S is released. By this time brush S4 is standing on the second terminal in the P. B. X trunk group. If that trunk is busy also, the above described cycle of operation is repeated and the switch is stepped in its secondary direction once more. Eventually, the switch either reaches the end of the P. B. X trunk group or finds an idle trunk.

*All-trunks-busy.*—Assuming first that all trunks in the P. B. X trunk group are busy, a circuit is completed by way of the strapping across terminals S5 and HS5 of the last trunk in the P. B. X group. A circuit may now be traced from the busy ground marking which is on the sleeve terminal in bank S5 of the last P. B. X trunk line through resistor R41, brush HS4, operated contacts 472, 361, 351, 443, 422, 266, and the lower winding of relay 420 to (−) battery. Relay 420 does not restore when secondary magnet interrupter contacts 203 open because it is held over its lower winding. Contacts 521 do not open; therefore, secondary magnet S remains energized and cannot take another step. Secondary interrupter contacts 203 are now standing open. Hence, the circuit which formerly could have been traced from operated contacts 332, through contacts 203, 265, 421, 251, and the winding of P. B. X hunt relay 260 to (−) battery is now open.

Relay 260 restores. Contacts 261 close thereby extending busy tone to the calling subscriber, the circuit being from the busy tone conductor through contacts **451*a*, 261, 462, the upper winding of answer bridge relay 210, and the tip conductor. This informs the calling subscriber of the fact that he cannot cmoplete the call. A circuit is completed from conductor HS2 over contacts 216, 268, 462*a* and 454 to the (−) 60 IPM conductor. The signal is used to inform any operators that might have participated in establishing the call of the fact that an all-busy condition has been reached. Contacts 264 close thereby connecting switchthrough relay 460 to sleeve conductor S4. Switchthrough relay 460 does not operate since busy test relay 450 is holding contacts 453 open. Contacts 263 open to break one circuit to the busy test relay from sleeve conductor S4; however, contacts 262 close before contacts 263 open to hold busy test relay 450 in an operated condition until the call is abandoned. The circuit for holding this relay extends from (−) battery through the winding of busy test relay 450, rest contacts 467, 262, 452 and 232** to ground (+).

Hunt assist relay 420 restores because one of its holding circuits is open at contacts 265, and the other of its holding circuits is open at contacts 266.

The busy tone continues to be transmitted and nothing further happens until the calling subscriber hangs-up at which time the trunk circuit is released in the manner explained below in the section entitled "Release."

*Idle line.*—Next, it is assumed that an idle P. B. X trunk line is found before the end of group marking resistor R41 is encountered. In this case, sleeve conductor S4 does not encounter a ground (+) marking when it tests the terminals associated with the idle trunk. Also, there is no marking on conductor HS4. It might be noted that P. B. X hunt relay 260 is operated at the time that the busy test is made. Busy test relay 450 has been operating over a circuit which might be traced from (−) battery through the winding of relay 450, rest contacts 467, 263 and conductor S4 to the busy ground on the associated terminal in bank S5. Since this busy ground marking is not present, busy test relay 450 does not operate. Contacts 451*a* open thereby breaking the circuit for busy tone. Contacts 451 open thus breaking the path for re-energizing hunt assist relay 420. It does not re-energize to drive the switch another step in its secondary direction. Thus, switch motion stops. Hunt assist relay 420 cannot remain operated over its lower winding since brush HS4 is not marked, this being an idle P. B. X trunk line which is neither marked by ground G41 nor resistor R41.

P. B. X hunt relay 260 restores since hunt assist relay 420 does not reoperate contacts 421 before the expiration of the slow release time interval of relay 260. Formerly, the circuit could have been traced from (−) battery through the winding of relay 260, rest contacts 251, operated contacts 421, 265, secondary magnet interrupter contacts 203 and master ground 332. When P. B. X hunt relay 260 releases, contacts 264 close thus connecting switchthrough relay 460 to be operated over sleeve brush S4. The circuit is traced from an idle battery marking in the called line circuit, which is not shown, over brush S4, rest contacts 264, the upper winding of switchthrough relay 460, rest contacts 453 and operated contacts 232 to ground (+).

Switchthrough relay 460 operates to its "X" or preliminary contacts 561. A circuit is now completed for operating the relay fully. This circuit may be traced from (−) battery through the lower winding of switchthrough relay 460, and "X" or preliminary contacts 561 to master ground (+) at contacts 332. Switchthrough relay 460 now operates completely. Contacts 462 open and 463 close thereby extending ground (+) through the upper winding of answer bridge relay 210 in preparation for furnishing the ground for talking battery which is extended to the called subscriber. A similar circuit is completed through contacts 464 to prepare to furnish the (−) potential of the talking battery to the called subscriber. Contacts 461 and 465 close to extend the talking conductor to the called subscriber's station. Contacts 466 close to apply a ground (+) marking to sleeve conductor S4, thereby marking the trunk line as busy to all other calls. It might be noted that contacts 466 do not close until after "X" or preliminary contacts 561 have closed; hence, there is no danger of shunting switchthrough relay 460 before it can operate fully and lock. Ring-back tone is now extended to the calling subscriber, thus informing him of the fact that the called party is being signaled. The circuit may be traced from the ring-back tone conductor through operated contacts 469, rest contacts 276 and conductor R2 to the called subscriber. Contacts 461*a* break the path for giving the operator a signal when a busy test is encountered. Contacts 562 and 563 have no function on this call.

*Ringing*.—The output of the regular ringing current generator is connected through contacts 572, the upper winding of ring trip relay 370, rest contacts 273, operated contacts 465, brush R4, and the following equipment to the called subscriber station. From here a circuit is returned over conductor T4, contacts 461 and 271 to ground (+). Ringing current is applied over this circuit to signal the called subscriber.

*Answer*.—When he answers, a suitable loop circuit is connected across conductors R4 and T4. This loop circuit is effective for completing the connection from direct ground on contacts 271 to the (−) battery superimposed upon the regular ringing current generator conductor. This is over the circuit just traced by way of the upper winding of ring trip relay 370, causing it to operate to its "X" or preliminary contacts 371. Contacts 373 are make-before-break so that a preliminary circuit is completed from (−) battery through the lower winding of ring trip relay 370, contacts 373, 371 and 332 to ground (+) before the original operate circuit is broken at contacts 271 and 273. The remaining contacts operate when relay 370 operates fully responsive to completion of the circuit through its lower winding. Contacts 272 and 274 close to complete the talking circuit from the calling to the called subscriber. Contacts 275 have no function in this call since it is assumed that relay 570 has operated. Contacts 276 open to break the circuit from the ring-back tone conductor. Contacts 376 open to stop the common interrupter which was operated when the start conductor was originally marked by ground (+) at contacts 335 responsive to the operation of release delay relay 330.

Answer bridge relay 210 operates when the called subscriber answers. The circuit extends from (−) battery through the lower winding of relay 210, contacts 464, 274, 465, conductor R4, the talking loop to the called subscriber station and return over conductor T4, contacts 461, 272, the upper winding of relay 210, and contacts 463 to ground (+). Conductor HS2 is marked by (−) battery at contacts 215. An alternate master ground (+) is applied at contacts 311.

The call is completed and conversation follows. Nothing further happens until the subscribers terminate their conversation.

*Release*.—Last party release is provided. It might be noted that calling bridge relay 220 originally operated over the loop completed through the calling subscriber station; whereas, answer bridge relay 210 originally operated over the loop completed through the called subscriber station. When the called subscriber hangs up, answer bridge relay 210 restores and opens contacts 311 thereby removing one master ground (+) connection. When calling bridge relay 20 restores, it opens contacts 321 thus restoring release delay relay 330. Responsive thereto, contacts 332 open to remove another master ground (+) connection. All other relays which are then operated are holding from this master ground so that the switch returns to normal when contacts 334 and 564 close to connect magnet R to the release alarm conductor. The circuit is then returned to normal and ready for the next call.

CALL TO INDIVIDUAL OR PRIVATE LINE

The first three sets of terminals in banks S5 and HS5 are indicated as individual or private lines. Lines of this type require the regular ringing current generator. Therefore, level marking relay 570 operates in the manner described above. There is no ground on the HS5 terminal corresponding to ground G41 which marks the beginning of the P. B. X trunk group. Hence, no circuit is completed for operating trunk hunt relay 440 as was the case where a P. B. X trunk group was encountered. It might be recalled that the circuit for operating this relay extended from (−) battery through the winding of relay 440, rest contacts 444, 351, 361, 472 and brush HS4 to ground G41. Since trunk hunt relay 440 does not operate, no circuit is completed for operating hunt assist relay 420. Hence, contacts 421 do not operate and P. B. X hunt relay 260 restores. Other than these changes the circuit functions in the manner explained above in connection with the P. B. X call.

CALL TO PARTY LINES

The next call to be explained is one to party line subscribers. In this case there is no L wiring on the level reached at the end of the primary switch motion, so that level marking relay 570 does not operate. Contacts 571 and 572 do not operate. Hence regular ringing current generator 17 is not connected to signal the called party. Rather, signaling current is from the one or two ring ringing current generator 18.

Referring to banks S5 and HS5, it is seen that there are ten ringing control conductors M1–M10. The particular ringing conductor which is used determines which ringing signal is extended to signal the called subscriber. For example, the ninth terminal in bank HS5 is strapped to signal the called subscriber by means of the particular frequency and/or code that is applied at the time when a ground pulse appears on conductor M2. On the other hand, if the switch was directed in its secondary motion to the tenth level in bank HS5, the frequency and/or code which is produced by generator 18 at the time when a ground pulse appears on conductor M9 is used to signal the called subscriber. Hence, the particular coded frequency of ringing current that is to be used is determined by the strapping applied to bank HS5. One example of how this feature may be provided is fully explained in U. S. Patent 2,702,831 that was granted to George Elliott, on February 22, 1955.

Briefly, a series of ground pulses are applied by any suitable means (not shown) to conductors M1–M10 in a time displaced sequence, i. e., first there is a ground pulse on wiring M1; then, after that pulse has ended, a second ground pulse appears on wiring M2; after that there is a pulse on wiring M3, etc. After the ground pulse appears on and is removed from wiring M10, the cycle is repeated, starting with wiring M1. These pulses are produced in synchronism with the output of generator 18, that is, just before a coded series of ringing current pulses is produced by generator 18, a ground pulse corresponding to that series is applied to one of the wirings M1–M10.

Let it be assumed, for the sake of explanation, that the call is through the last set of terminals, i. e., the tenth step in the secondary direction. There is a wiring from strap M9 to bank HS5. Hence, a ground pulse is applied to brush HS4 in the ninth time frame. This ground pulse is extended over the circuit including contacts 471, 275, 468 and through the winding of relay 450 to (−) battery. Relay 450 operates and closes contacts 551 thereby connecting the output of generator 18 to provide the particular code that is being transmitted during the ninth time frame. Assuming that the code is extended over the "one ring" conductor, a circuit may be traced via contacts 532, 511, 551, 571, the upper winding of relay 370, contacts 273, 465, brush R4, the loop to the called subscriber and return over brush T4, contacts 461 and 271 to ground (+). At the end of the ninth time frame, the ground pulse is removed from conductor M9 to release relay 450 so that application of the ring current is terminated until the next time that a ground pulse is applied to conductor M9 to operate relay 450.

The foregoing description has referred to the ringing current that is applied during each time frame as "coded." It should be obvious that this reference is for explanatory purposes only. Frequency selective or other types of signal current may be used also.

While I have shown and described only a single embodiment of my invention, it should be obvious that various modifications may be made without departing from the spirit thereof. Therefore, it is my intention to cover within the scope of the attached claims not only the particular embodiment which is shown in the attached drawings, but also all other modifications which may fall within the true spirit of my invention.

What I claim is:

1. A connector for use in a telephone switching system comprising a plurality of brushes, a bank of terminal contacts divided into levels, an auxiliary brush, an auxiliary bank of contacts, means for moving said first mentioned brushes in a primary motion, means for simultaneously therewith moving said auxiliary brush over said auxiliary bank in synchronism with said motion of said first mentioned brushes, means for selectively marking said bank of auxiliary contacts according to the level to which said switch is directed in said primary motion, a first ringing current generator, a second ringing current generator, and means responsive to said level marking for selectively switching between said two ringing generators.

2. The connector of claim 1 wherein said first mentioned brushes includes two control brushes, each of said levels of bank contacts includes two sets of control terminals, means for selectively marking one set of said control terminals for trunk hunting or the type of ringing current required, and means for marking the other set of said control terminals according to the idle or busy state of a corresponding telephone line.

3. The telephone system of claim 2 wherein one of said ringing current generator means supplies regular ringing current, the other of said ringing current generator means supplies one and two ring frequency, coded ringing current.

References Cited in the file of this patent

UNITED STATES PATENTS 2,542,272 Bakker ---------------- Feb. 20, 1951

UNITED STATES PATENT OFFICE

CERTIFICATE OF CORRECTION

Patent No. 2,806,089 September 10, 1957

Ernest H. Gatzert

It is hereby certified that error appears in the printed specification of the above numbered patent requiring correction and that the said Letters Patent should read as corrected below.

Column 4, line 26, for "push" read -- path --; column 5, line 4, for "release" read -- releases --; line 7, for "partly" read -- party --; line 74, for "contacts 352" read -- contacts 252 --; column 6, line 52, for "cmoplete" read -- complete --; column 8, line 41, for "relay 20" read -- relay 220 --.

Signed and sealed this 5th day of November 1957.

(SEAL)

Attest:

KARL H. AXLINE
Attesting Officer

ROBERT C. WATSON
Commissioner of Patents